F. J. BOGGS.
Blind-Stops.

No. 157,983.

Patented Dec. 22, 1874.

Witnesses;
Jas. F. DuHamel.
Thomas Byrne

Inventor;
F. J. Boggs
Per H. S. Abbot.
Attorney.

UNITED STATES PATENT OFFICE.

FRANCIS J. BOGGS, OF KANSAS CITY, MISSOURI.

IMPROVEMENT IN BLIND-STOPS.

Specification forming part of Letters Patent No. 157,983, dated December 22, 1874; application filed November 23, 1874.

CASE B.

*To all whom it may concern:*

Be it known that I, FRANCIS J. BOGGS, of Kansas City, county of Jackson and State of Missouri, have invented certain new and useful Improvements in Blind-Stops, of which the following is a specification:

The object of my invention is to provide a more convenient arrangement for the regulation of a series of pivoted slats; and it consists in a connecting-bar with a notched metallic frame, a peculiarly-shaped loop-spring, and a pivoted bar arranged vertically in the frame with a suitable handle or lever, whereby such slats may be adjusted at any angle desired, and locked from the inside, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
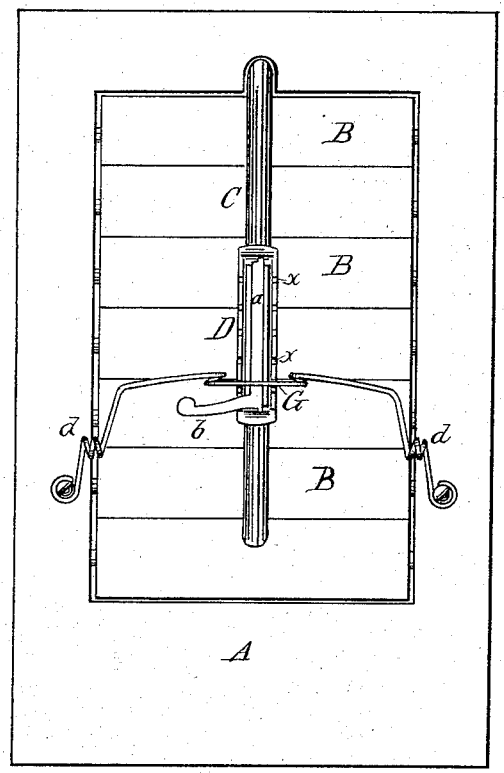
Figure 2:
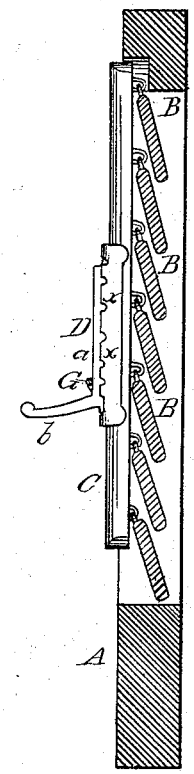

Figure 1 is a front view of a window-blind, embodying my invention, and Fig. 2 is a transverse vertical section of the same.

A represents the blind-frame; B B, the horizontal pivoted slats therein; and C, the rod or bar connecting the slats, said parts being all constructed in any of the known and usual ways. On the connecting-bar C is secured a metallic frame, D, the sides of which are provided with notches $x$ $x$ in their front edges at suitable intervals. In the frame D is placed a bar, $a$, in front of and parallel with the connecting-bar C. This bar $a$ is pivoted in the ends of the frame D, and is at its lower end provided with a handle or lever $b$. To the side rails of the frame A, at a suitable height from or above the lower end thereof, are fastened the ends of a wire, which are coiled to form a spring, $d$, on each side, and from which springs the wire extends upward and then inward, the center of the wire forming a loop, G, which is held closely against the notched frame D by the action of the springs $d$.

It will readily be seen that when the bar $a$ is turned flat in the frame D the spring-loop G bears in the notches of the frame, and thus holds the slats firmly. The bar $a$ will, when turned by the handle $b$ one-fourth of a revolution, raise the spring-loop G from said notches, and by means of said handle the slats may then be turned to any angle desired, and as soon as the bar $a$ is again turned to either side the spring-loop takes into the notched frame and locks the slats.

By this device the slats may be adjusted at any angle desired and locked from the inside, whereby, also, the rattling of the slats in windy weather is prevented.

This device may be applied to any windows and doors of this class, both old and new.

Having thus fully described my invention. what I claim as new, and desire to secure by Letters Patent, is—

The combination with the frame A, pivoted slats B, and connecting-bar C, of the notched metallic frame D, pivoted bar $a$, having lever or handle $b$, and the wire attached to the frame A and forming the springs $d$ $d$ and loop G, all substantially as and for the purposes herein set forth.

In testimony that I claim the foregoing as my invention, I hereunto affix my signature.

FRANCIS J. BOGGS.

Witnesses:
   A. C. MOFFAT,
   J. S. HARRISON.